(12) United States Patent
Ee (10) Patent No.: US 11,710,503 B1
(45) Date of Patent: Jul. 25, 2023

(54) GIMBAL ASSEMBLY GEOMETRY FOR HARD DISK DRIVE

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/986,201

(22) Filed: Nov. 14, 2022

Related U.S. Application Data (63) Continuation of application No. 17/838,042, filed on Jun. 10, 2022, now Pat. No. 11,501,796.

(51) Int. Cl.
*G11B 5/48* (2006.01)

(52) U.S. Cl.
CPC .......... *G11B 5/4813* (2013.01); *G11B 5/4833* (2013.01)

(58) Field of Classification Search
None
See application file for complete search history.

(56) References Cited

U.S. PATENT DOCUMENTS

| | | |
|---|---|---|
| 8,049,995 B1 | 11/2011 | Ee et al. |
| 9,418,687 B2 | 8/2016 | Terada et al. |
| 11,501,796 B1 | 11/2022 | Ee |
| 2003/0128635 A1 | 7/2003 | Ruigrok et al. |
| 2011/0096438 A1 | 4/2011 | Takada et al. |

FOREIGN PATENT DOCUMENTS

| | | |
|---|---|---|
| JP | 2019-519875 A | 7/2019 |
| JP | 2019-133731 A | 8/2019 |
| JP | 2021-144770 A | 9/2021 |

OTHER PUBLICATIONS

Notice of Allowance in Japanese Application No. 2022-153786, dated Dec. 6, 2022.
Notice of Allowance in U.S. Appl. No. 17/838,042, dated Aug. 19, 2022.

*Primary Examiner* — Carlos Garcia
(74) *Attorney, Agent, or Firm* — DLA Piper LLP (US)

(57) ABSTRACT

A gimbal assembly includes a frame having base, tip and mount portions, and a crossbar joined to the tip portion by a neck region. Portions of the crossbar and neck region define transition edge regions each extending from a point of minimum width D of the neck region to where the edge of the crossbar becomes substantially straight. Each of the transition edge regions includes a transition length a and a transition width b. The frame comprises an area of interest that includes the neck region and a portion of the crossbar that has a length of 0.6 mm and is centered to the neck region, and has a total area size A, a centroid C and a centroid distance H between the centroid C and a far side of the neck region. The crossbar and neck region have geometries that satisfy a design metric that is less than 0.05.

6 Claims, 10 Drawing Sheets

GIMBAL ASSEMBLY GEOMETRY FOR HARD DISK DRIVE

CROSS-REFERENCE TO RELATED APPLICATIONS

This application is a Continuation of U.S. patent application Ser. No. 17/838,042, filed on Jun. 10, 2022, which is hereby incorporated by reference in its entirety.

FIELD OF THE INVENTION

The present disclosure relates to hard disk drives, and more particularly to a suspension assembly for hard disk drives.

BACKGROUND OF THE INVENTION

A hard disk drive (HDD) is a non-volatile storage device that stores digitally encoded data on one or more circular disks having magnetic surfaces. In operation, each disk spins rapidly. Data is read from and written to the disk using a read-write head that is positioned over a specific location of the disk by a suspension assembly, which in turn rotated by an actuator. The suspension assembly includes a load beam. In operation, the actuator positions the distal end of the load beam over the desired portion of the disk (e.g., one of the circular tracks on the disk surface). A gimble assembly is mounted to the distal end of the load beam. The gimble assembly includes components such as a slider containing the read-write head and PZT devices that rotate a portion of the gimbal assembly for fine positioning of the slider (as opposed to more course positioning of the slider by the actuator). The pressure caused by air viscosity between the slider and the spinning disk causes the slider to hover over (in close proximity to) the surface of the disk. While the load beam is relatively stiff, the gimbal assembly is more flexible so that the slider can pitch and roll as it floats over the disk surface in order to maintain its operational distance immediately over the disk surface.

Figures 1, 2, 3:
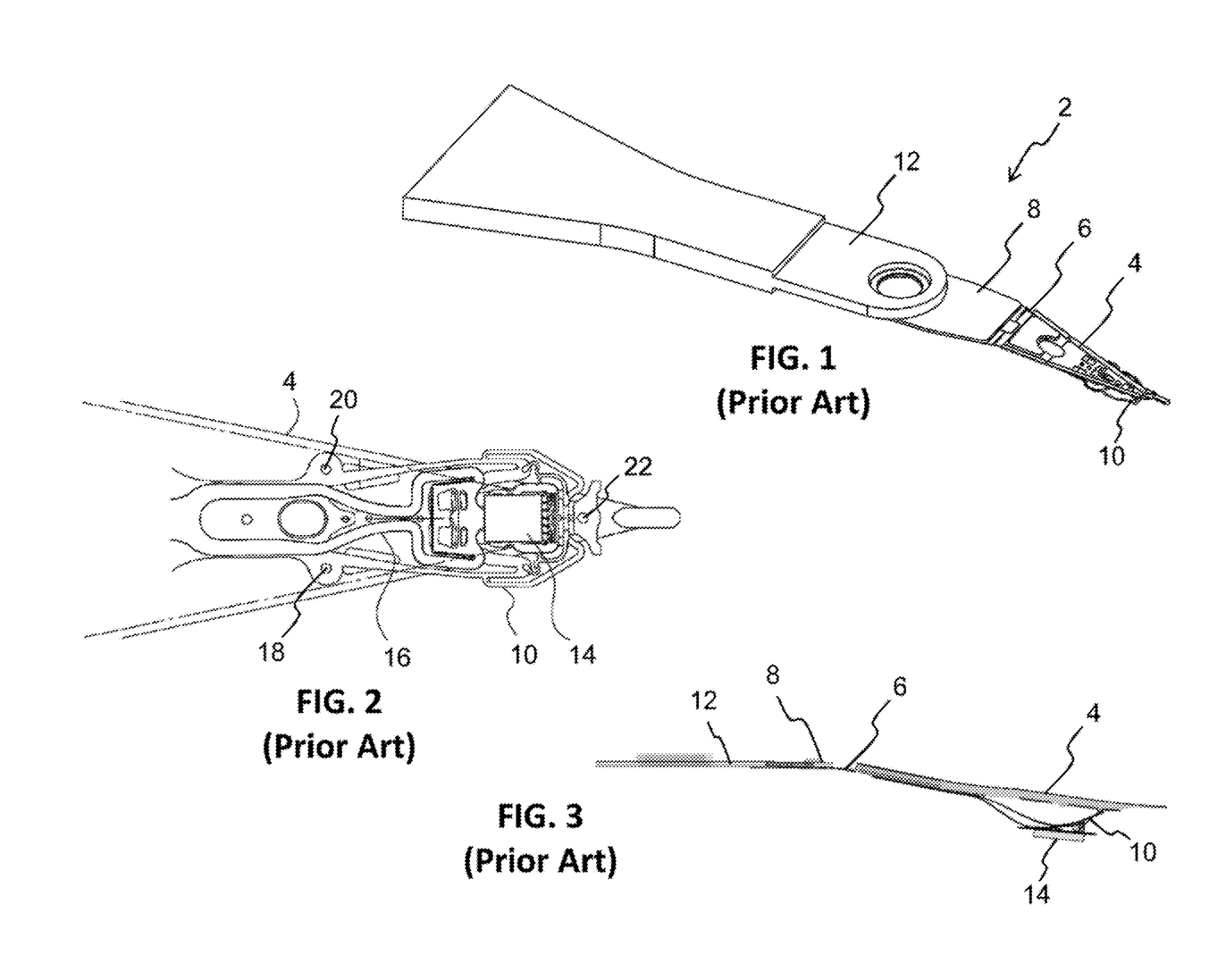
FIG. 1 is a perspective view of a conventional suspension assembly.
FIG. 2 is a bottom view of a conventional gimbal assembly.
FIG. 3 is a side view of a conventional suspension assembly during a shock event.

FIGS. 1-2 illustrate a conventional suspension assembly 2, which includes a load beam 4 terminating at a proximal end with a hinge 6 that is connected to a baseplate 8. A gimbal assembly 10 (containing the slider with the read/write head) is mounted to the distal end of the load beam 4. The baseplate 8 is connected to an actuator arm 12, which is moved by an actuator (not shown). As best shown in FIG. 2, gimbal assembly 10 comprises thin components of sheet metal (e.g., stainless steel) on which the slider 14 is mounted (e.g., by adhesive). A flex circuit 16 (i.e., electrical traces) extend along the load beam 4 and gimbal assembly for electrical signal communication to the read/write head and PZT's.

The gimbal assembly 10 can be attached to the load beam 4 by welding at three weld locations 18, 20, 22. Additional welds may be added at locations toward the hinge for rigidity (not shown). These weld attachments can be spot welds between the load beam 4 and the gimbal assembly 10. Two of the welds 18 and 20 are located at a base portion of the gimbal assembly (closer to the proximal end of the load beam 4), and the third weld 22 is located at a distal end of the gimbal assembly and a distal end of the load beam 4. This third weld 22 can be referred to as a tip weld 22.

The gimbal assembly 10 is configured to exhibit low stiffness so that it can flex, which allows the slider 14 to float over the disk surface during operation. However, the gimbal assembly must be able to tolerate the stress of large deformations during inevitable high shock events especially when the suspension is parked away from the disk during non-operation. FIG. 3 illustrates the deformation of a conventional gimbal assembly during an extreme shock scenario when in the parked position (away from the disk). As shown in FIG. 3, during a shock event, the gimbal assembly 10 flexes away from the load beam 4. Stress toleration includes avoidance of permanent deformation of the gimbal assembly components. The present disclosure is directed to balancing stiffness and stress tolerance for the gimbal assembly.

BRIEF SUMMARY OF THE INVENTION

The aforementioned problems and needs are addressed by a gimbal assembly that includes a frame of stainless steel having a thickness t. The frame includes a base portion, a tip portion, a mount portion disposed between the base portion and the tip portion, and a crossbar joined to the tip portion by a neck region having curved opposing edges. Portions of the crossbar and the neck region define a pair of transition edge regions each extending from a first point of minimum width D between the curved opposing edges of the neck region to a second point along an edge of the crossbar where the edge of the crossbar extending away from the neck region becomes substantially straight. Each of the transition edge regions includes a transition length a in a first direction which is parallel to a direction in which minimum width D extends and a transition width b in a second direction orthogonal to the first direction. The frame comprises an area of interest that includes the neck region and a portion of the crossbar that has a length of 0.6 mm and is centered to the neck region. The area of interest has a total area size A, a centroid C that is an arithmetic mean position of all points in the area of interest, and a centroid distance H that is a distance between the centroid C and a far side of the neck region. The crossbar and neck region have geometries such that:

$$0.8\left(\frac{D^{0.5} \times A}{0.7}\right)\left(\frac{t}{18}\right)^{2.25} + 0.2\left(\frac{1}{650}\right)\left(\frac{0.3}{(a^{0.2})(b^{0.15})(D^{0.2})(H^2)}\right)\left(\frac{t}{18}\right)^{-1.6} < 0.05.$$

A gimbal assembly includes a frame of stainless steel having a thickness t. The frame includes a base portion, a tip portion, a mount portion disposed between the base portion and the tip portion, and a crossbar joined to the tip portion by a neck region having curved opposing edges. Portions of the crossbar and the neck region define a pair of transition edge regions each extending from a first point of minimum width D between the curved opposing edges of the neck region to a second point along an edge of the crossbar where the edge of the crossbar extending away from the neck region becomes substantially straight. Each of the transition edge regions includes a transition length a in a first direction which is parallel to a direction in which minimum width D extends and a transition width b in a second direction orthogonal to the first direction. The frame comprises an area of interest that includes the neck region and a portion of the crossbar extending between the transition edge regions. The area of interest has a total area size A, a centroid C that is an arithmetic mean position of all points in the area of interest, and a centroid distance H that is a distance between the centroid C and a far side of the neck region. The crossbar and neck region have geometries such that:

$$0.8\left(\frac{D^{0.5} \times (A + 0.06)}{0.7}\right)\left(\frac{t}{18}\right)^{2.25} +$$

$$\left(\frac{0.2}{650}\right)\left(\frac{0.3}{(a^{0.2})(b^{0.15})(D^{0.2})((H + 0.07)^2)}\right)\left(\frac{t}{18}\right)^{-1.6} < 0.05.$$

Other objects and features of the present disclosure will become apparent by a review of the specification, claims and appended figures.

DETAILED DESCRIPTION OF THE INVENTION

Figure 4:
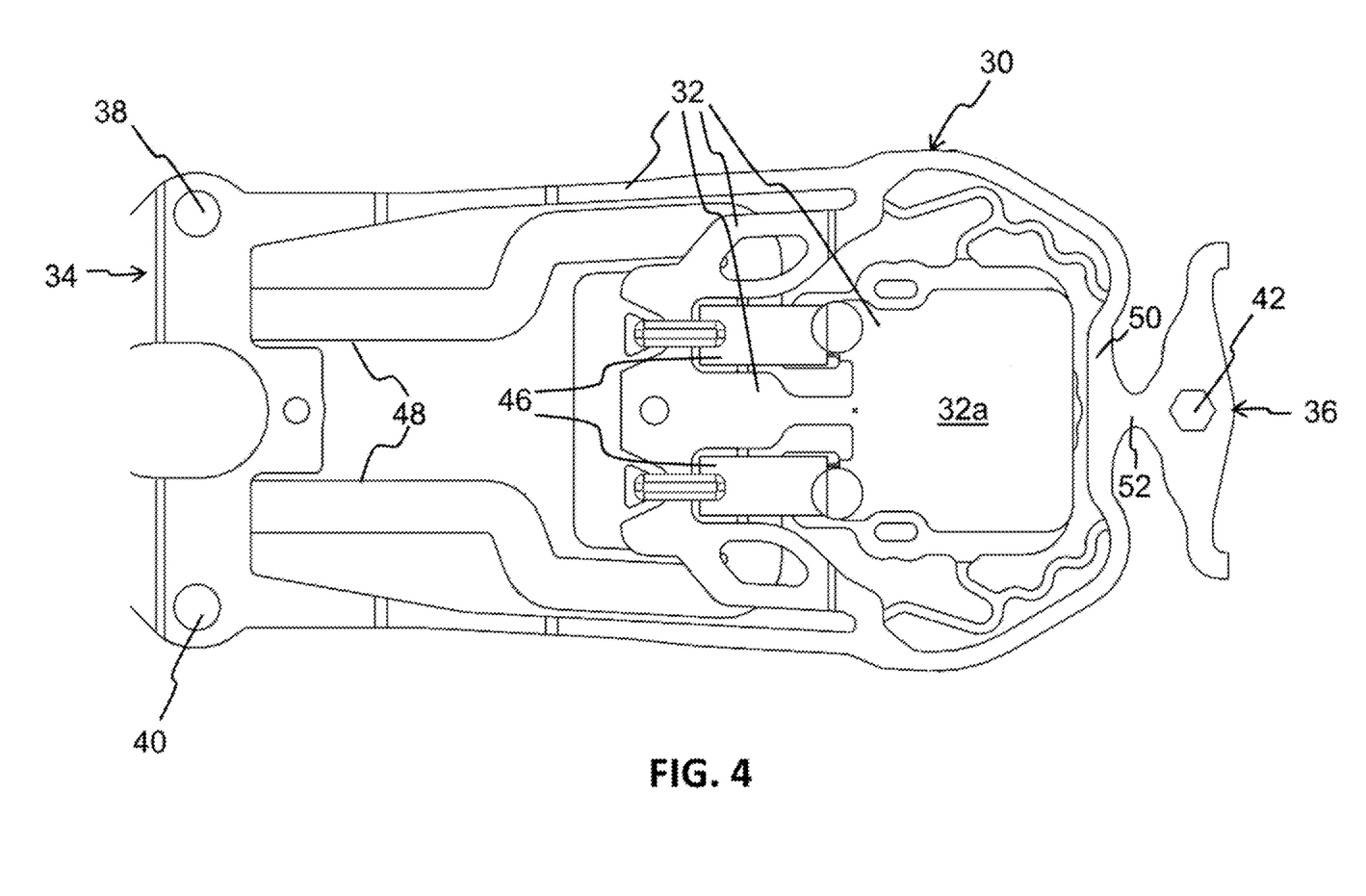
FIG. 4 is top view of a gimbal assembly according to the present disclosure.

FIG. 4 illustrates a gimbal assembly 30, which includes a frame 32 having a base portion 34, a tip portion 36, and various segments therebetween including mount portion 32a, all formed of stainless steel sheet metal. The base portion 34 includes two weld locations 38, 40, and the tip portion 36 includes a weld location 42. It is at these weld locations 38 40, 42 that the frame 32 is welded to the load beam. A slider (similar to slider 14 described above) containing the read/write head is mounted to the mount portion 32a of frame 32 (hidden from view and not shown in FIG. 4). PZT's (piezoelectric devices) 46 are mounted between two portions of the frame 32, whereby expansion and contraction of the PZT's 46 rotate the mount portion 32a of the frame 32 on which the slider is mounted (for fine tune positioning of the slider). Flex circuit 48 includes electrical traces that are connected to, and provide electrical signaling to/from, the PZT's 46 and the read/write head of the slider. The frame 32 includes a crossbar 50 that is connected to the tip portion 36 by a neck 52. The present disclosure is directed to the shape and dimensions of the tip portion 36, neck 52 and crossbar 50 that provide superior performance relative to conventional gimbal frame designs.

Figure 5:
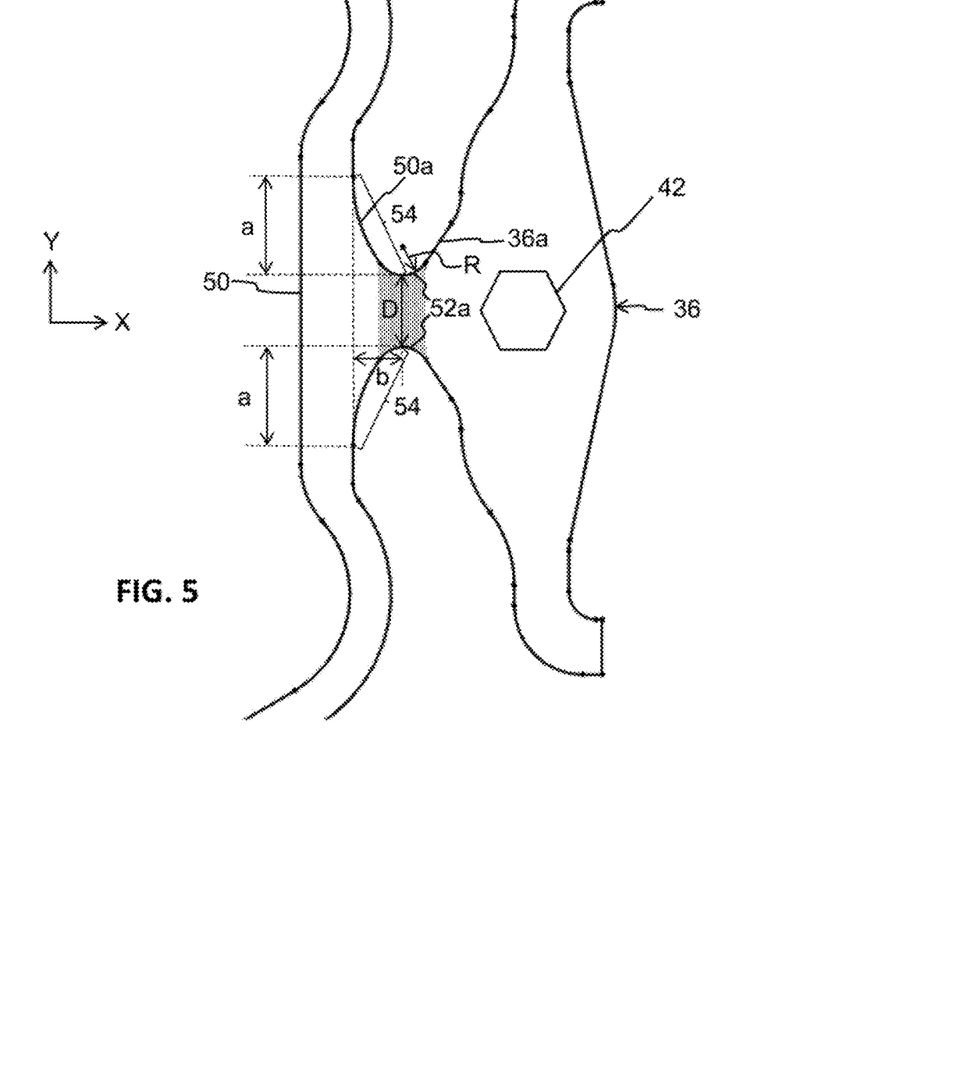
FIG. 5 is a partial top view of the tip portion geometry of the gimbal assembly.

FIG. 5 illustrates the tip portion 36, neck region 52 and crossbar 50 of the gimbal assembly frame 32. The neck region 52 is that portion of the frame that joins the crossbar 50 and tip portion 36. Neck region 52 has a geometry that includes a minimum width D between curved opposing edges 52a of the neck region 52. The neck region edges 52a can include those portions of the edges of the frame 32 that have the radius of curvature R existing at the center of neck region 52 where minimum width D exists (i.e., up to the point where the edges of the frame 32 begin to straighten out and transition to the edges 36a of the tip portion 36 and edges 50a of the crossbar 50). The edges 52a of the neck region 52 and the edges 50a of the crossbar 50 define a pair of transition edge regions 54 each extending from the point of minimum width D (also referred to herein as the first point) to a second point along the edge of the crossbar 50 where the edge of the crossbar 50 extending away from the neck region 52 becomes substantially straight. Each transition edge region 54 defines a transition length "a" in a first direction which is parallel to the direction in which minimum width D extends (e.g., the y-direction in FIG. 5), and a transition width "b" in a second direction that is orthogonal to the first direction in which the minimum width D extends (e.g., the x-direction in FIG. 5).

Figure 6:
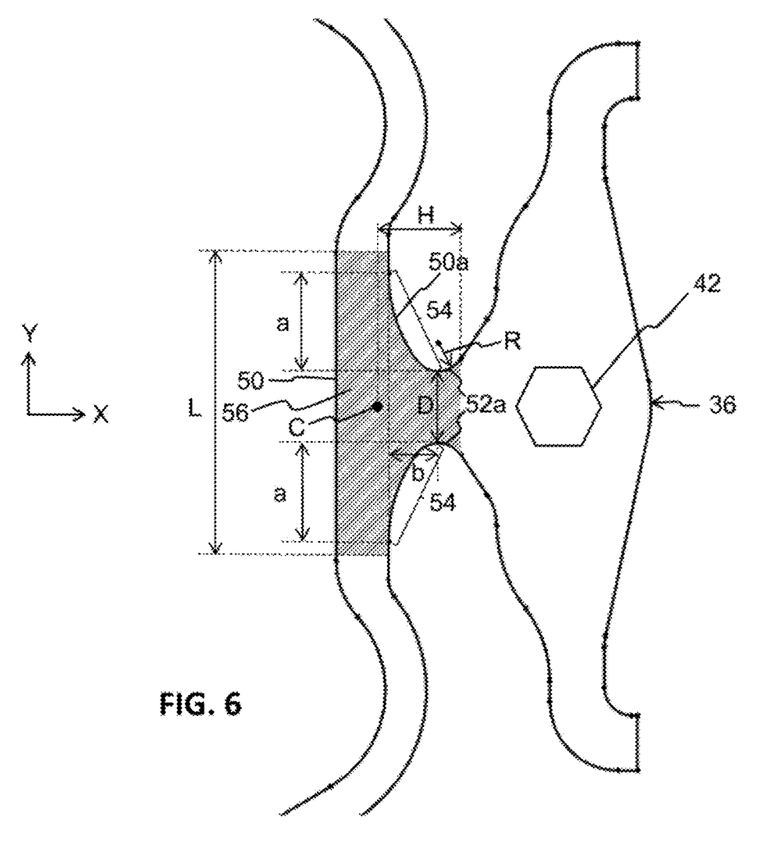
FIG. 6 is a partial top view of the tip portion geometry of the gimbal assembly.

The neck region 52, and a portion of the crossbar 50, together define an area of interest 56 that is illustrated in FIG. 6. The area of interest 56 includes the neck region 52 and extends beyond that portion of the crossbar 50 between the far ends of transition edge regions 54 (i.e., between the second points). Specifically, it has been discovered that the area of interest 56 can have a length L along the crossbar 50 that is longer than D+(2·a). Given the size constraints for modern disk drives, it has further been determined that the length L of the area of interest 56 along the crossbar 50 can be 0.6 mm when centered to the neck region. The area of interest 56 has a total area size A, and a centroid C which is the arithmetic mean position of all points in the area of interest 56. A centroid distance H is the distance between the centroid C and the far side of the area of interest 56 (i.e., the far side of neck region 52).

It has been discovered that the neck region 52 and the transition from the neck region 52 to the crossbar 50 strongly affects the performance of the gimbal frame 32 in terms of both stiffness and stress. More specifically, it has been determined that by forming the geometries of the neck region 52 and crossbar 50, and specifically the geometric parameters D, a, b, H and A identified above, along with the thickness t of the frame 32 at these locations to meet certain criteria, then improved stiffness and stress performance can be achieved. Parameters D, a, b, H are in units of mm, and A is in units of mm².

To better correlate the geometry of frame 32 near weld location 42 with the two mechanical performance requirements of lower roll stiffness and lower stress concentrations during non-operational shock events, an optimization function is first defined as expressed in in Equation 1 (where the material is stainless steel):

$$\text{opti function} = 0.8\left(\frac{Kr}{0.7}\right) + 0.2\left(\frac{\text{max stress}}{650}\right) \quad \text{Eq. 1}$$

The roll stiffness and max stress are normalized with 0.7 uNm/deg and 650 MPa respectively. Weighting values of 0.8 and 0.2 are given to the roll stiffness and max stress as well as shown in Equation 1. As shown in Equation 1, a smaller optimization function value gives a better combination of Kr and max stress.

The Kr (roll stiffness) and the max stress are then correlated with the geometrical parameters of the tip weld area of interest. A stiffness factor and a stress factor can be defined separately as indicated in Equations 2 and 3 to correlate to Kr and the max stress.

$$\text{stiffness factor} = D^{0.5} \times A \quad \text{Eq. 2}$$

$$\text{stress factor} = \frac{0.3}{(a^{0.2})(b^{0.15})(D^{0.2})(H^2)} \quad \text{Eq. 3}$$

Figure 7:
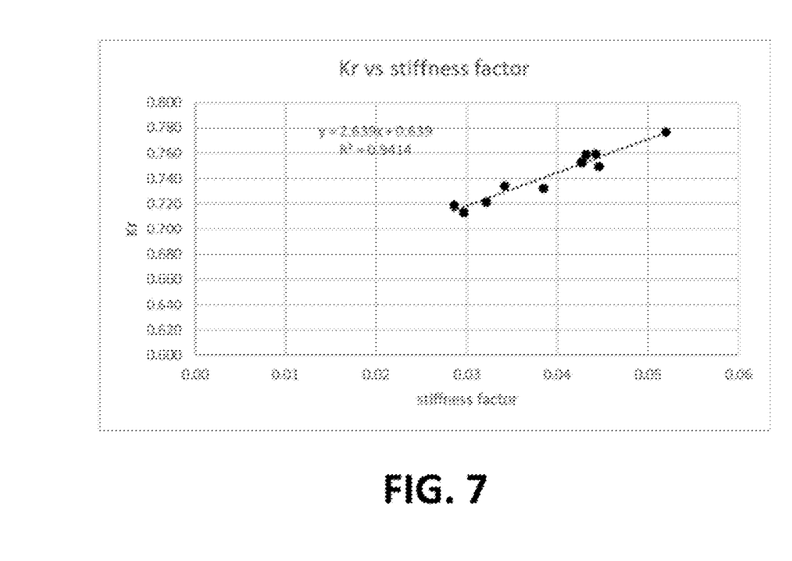
FIG. 7 is a graph of Kr vs stiffness factor.
Figure 8:
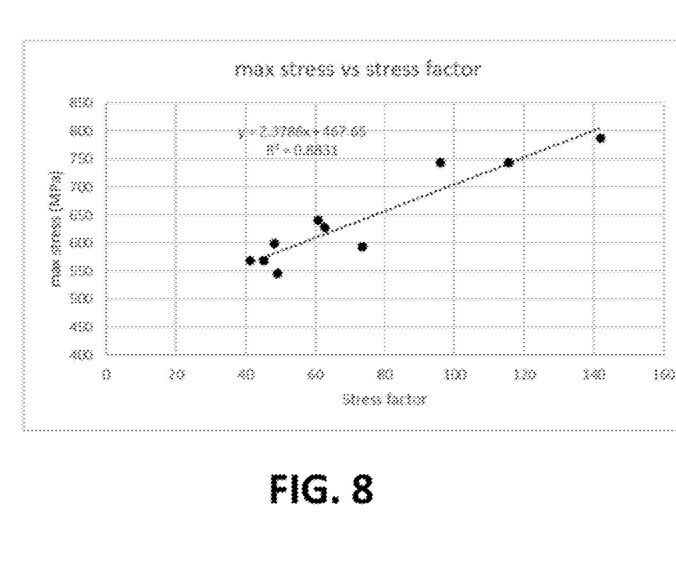
FIG. 8 is a graph of max stress versus stress factor.

FIGS. 7 and 8 show the plot of Kr vs the stiffness factor, and the plot of max stress vs stress factor.

Substituting Equation 2 and Equation 3 into Equation 1 provides a design metric dm for optimizing roll stiffness and the max stress, as shown in Equation 4.

$$dm = 0.8 \left( \frac{D^{0.5} \times A}{0.7} \right) + 0.2 \left( \frac{1}{650} \right) \left( \frac{0.3}{(a^{0.2})(b^{0.15})(D^{0.2})(H^2)} \right) < 0.05 \quad \text{Eq. 4}$$

Figure 9:
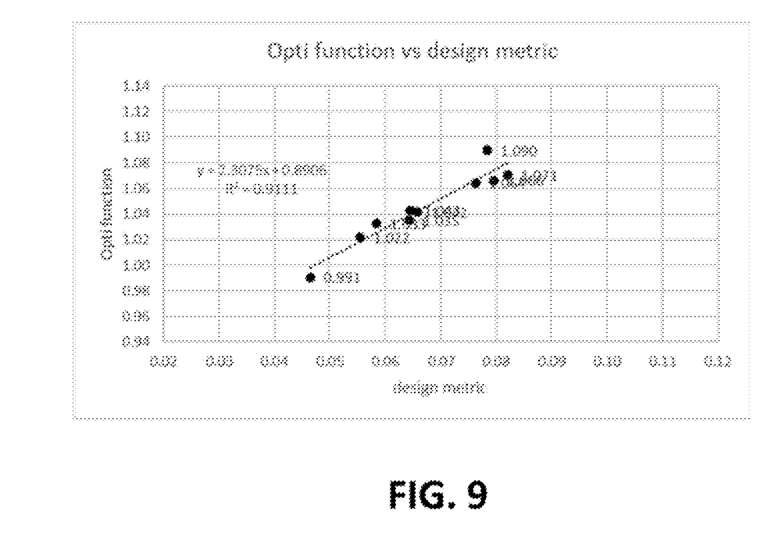
FIG. 9 is a graph of the optimization function versus design metric.

It has been discovered by the present inventor that the performance of the gimbal frame 32 adjacent the tip weld location 42 is superior for both Kr and the maximum stress when the design metric dm is <0.05. The plot of the optimization function against the design metric is shown in FIG. 9.

Figure 10:
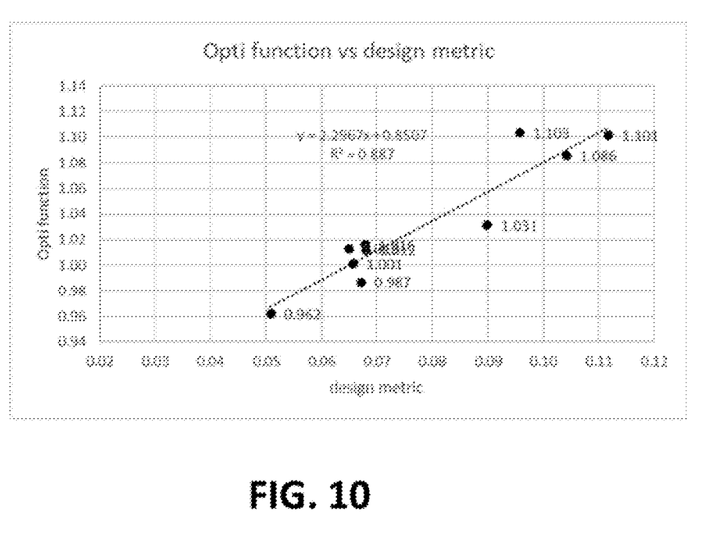
FIG. 10 is a graph of the optimization function versus design metric.

Since the weighting values used in Equation 1 may change if the stress has a more important role in an optimization, a comparison is carried out with 0.6 and 0.4 weighting values as shown in Equation 5 and plotted in FIG. 10. Comparing FIGS. 9 and 10, the data points shifted toward right and down, i.e., Equation 5 will rule out more design candidates that can meet the optimization objective.

$$dm = 0.8 \left( \frac{D^{0.5} \times A}{0.7} \right) + 0.4 \left( \frac{1}{650} \right) \left( \frac{0.3}{(a^{0.2})(b^{0.15})(D^{0.2})(H^2)} \right) < 0.05 \quad \text{Eq. 5}$$

Figure 11:
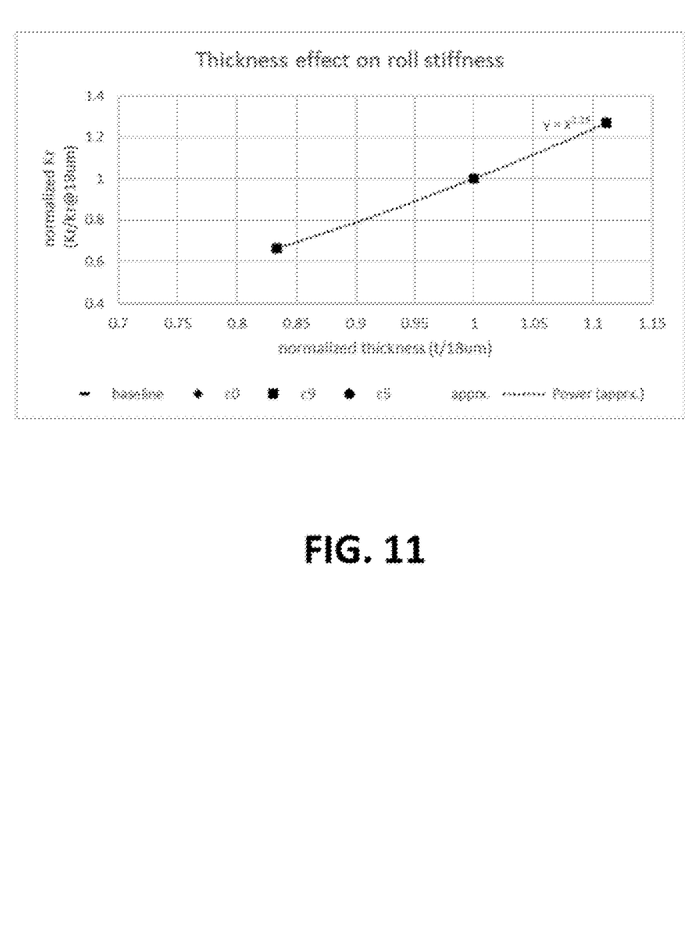
FIG. 11 is a graph of thickness effect on roll stiffness.
Figure 12:
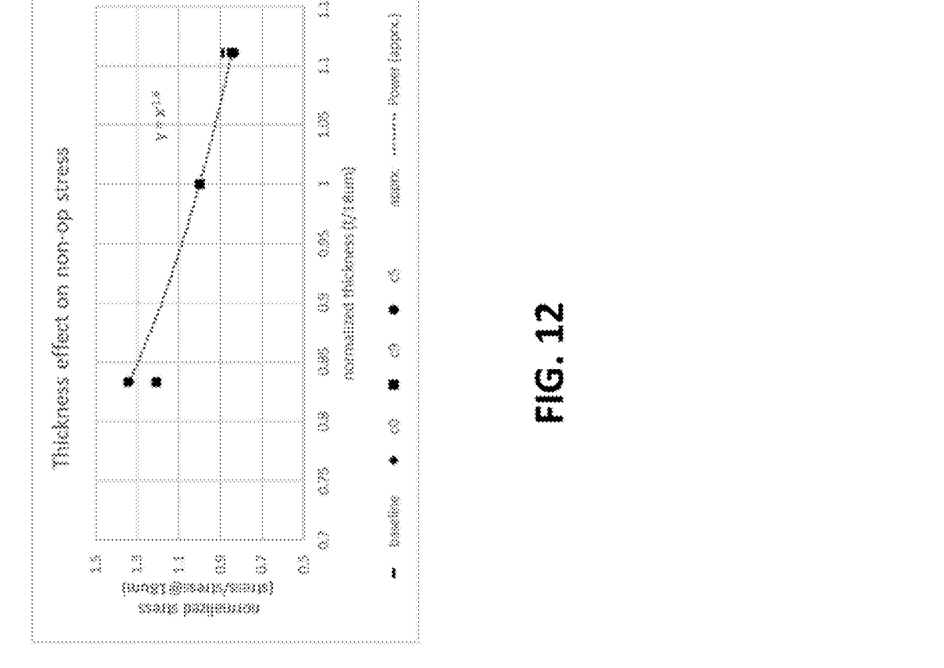
FIG. 12 is a graph of thickness effect versus non-operation stress.

It has also been discovered that the thickness of the stainless steel frame 32 affects performance. The results of analyzing different flexure thicknesses are shown in FIGS. 11 and 12. Therefore, expanding Equation 4 to account for the effect of frame thickness t (where t is units of µm) results in Equation 6:

$$dm = 0.2 \left( \frac{D^{0.5} \times A}{0.7} \right) \left( \frac{t}{18} \right)^{2.23} + \quad \text{Eq. 6}$$

$$0.2 \left( \frac{1}{650} \right) \left( \frac{0.3}{(a^{0.2})(b^{0.15})(D^{0.2})(H^2)} \right) \left( \frac{t}{18} \right)^{-1.6} < 0.05$$

When the geometry of frame 32 (and the tip portion 36, crossbar 50 and neck region 52 in particular) satisfy Equation 6, superior combined stress and stiffness performance is achieved).

Figure 13:
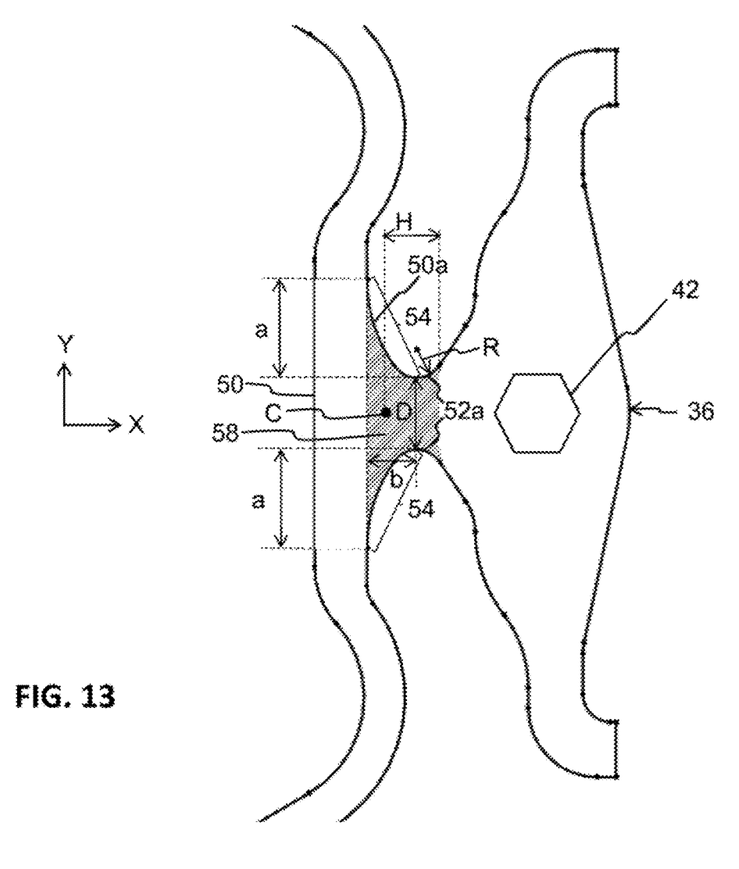
FIG. 13 is a partial top view of the tip portion geometry of an alternate example of the gimbal assembly.
Figure 14:
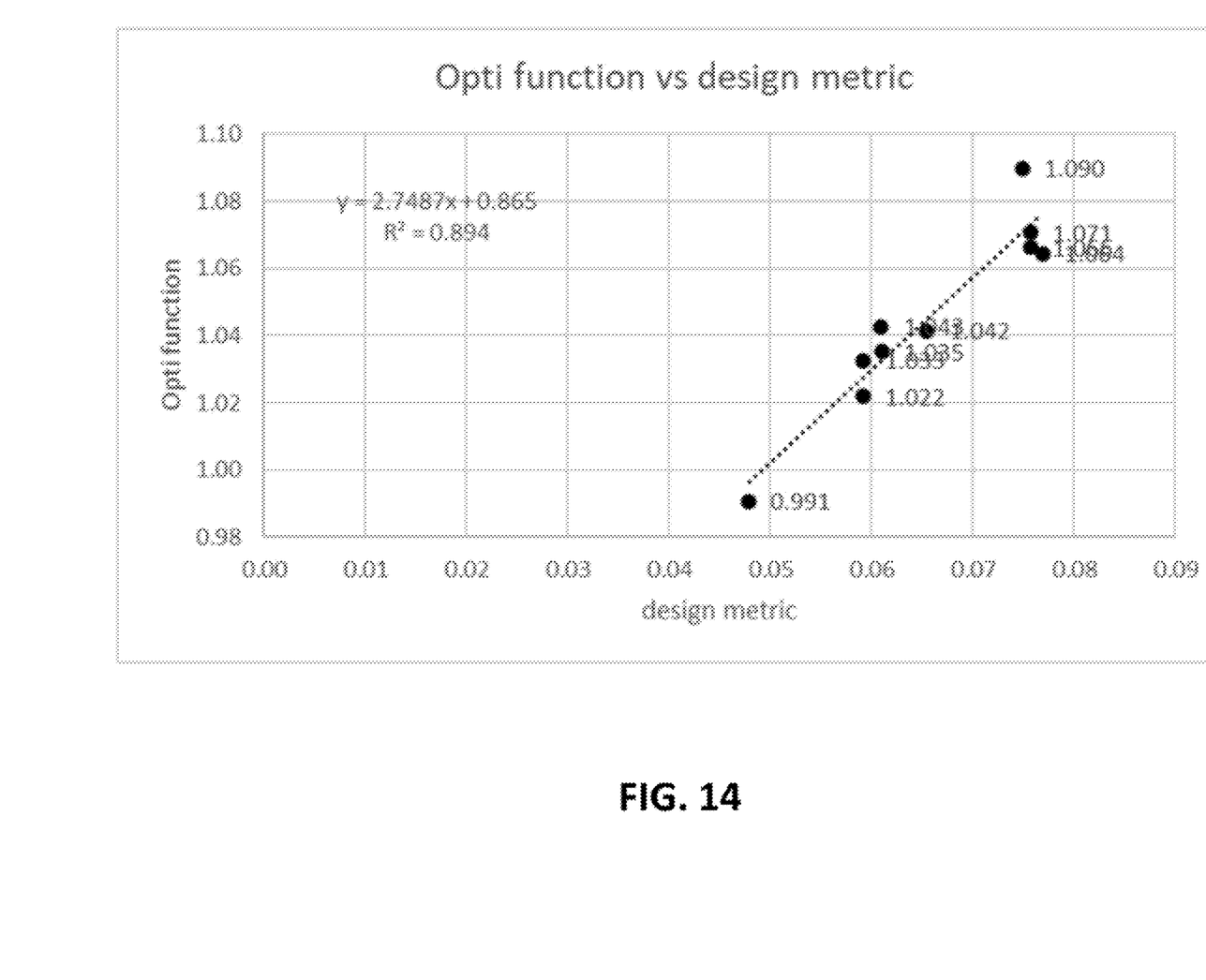
FIG. 14 is a graph of the optimization function versus design metric for the alternate example.

FIGS. 13-14 illustrate an alternative example. It has been determined that the area of interest 58 can be smaller than that shown in FIG. 6. Specifically, the area of interest 58 can include the neck region 52 and that portion of the crossbar 50 extending between the transition edge regions 54, as shown in FIG. 13. To accommodate the smaller area A of the area of interest 58 for this alternative example, it has been determined that design metric equation should be defined as:

$$dm = 0.8 \left( \frac{D^{0.5} \times (A + 0.06)}{0.7} \right) \left( \frac{t}{18} \right)^{2.25} + \quad \text{Eq. 7}$$

$$\left( \frac{0.2}{650} \right) \left( \frac{0.3}{(a^{0.2})(b^{0.15})(D^{0.2})((H + 0.07)^2)} \right) \left( \frac{t}{18} \right)^{-1.6} < 0.05$$

The plot of the optimization function against the design metric for Equation 7 is shown in FIG. 14. With an area of interest 58 as defined above and shown in FIG. 13 having area A, centroid C and centroid distance H resulting therefrom, the defined geometries provide superior combined stress and stiffness performance when Equation 7 is satisfied.

Figure 15:
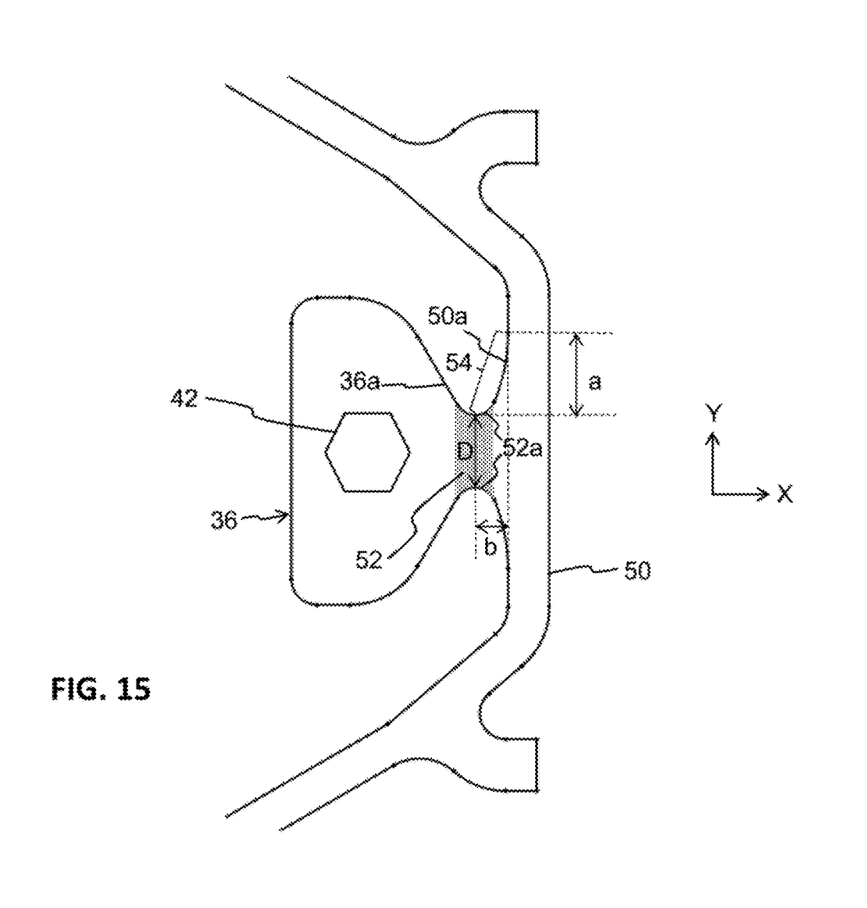
FIG. 15 is a partial top view of the tip portion geometry of an alternate example of the gimbal assembly.

FIG. 15 illustrates an alternative example, where the tip portion 36 containing the weld location 42 is disposed inside of the crossbar 50 (i.e., the crossbar 50 is located at the far end of the frame 32, such that the tip portion 36 is disposed between the crossbar 50 and the mount portion 32a of frame 32 on which the slider is mounted).

It is to be understood that the present disclosure is not limited to the example(s) described above and illustrated herein, but encompasses any and all variations falling within the scope of any claims. For example, references to the present invention, embodiments or examples herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A gimbal assembly comprising:
   a frame of stainless steel having a thickness t and comprising:
      a base portion,
      a tip portion,
      a mount portion disposed between the base portion and the tip portion, and
      a crossbar joined to the tip portion by a neck region having curved opposing edges,
      wherein portions of the crossbar and the neck region define a pair of transition edge regions each extending from a first point of minimum width D between the curved opposing edges of the neck region to a second point along an edge of the crossbar where the edge of the crossbar extending away from the neck region becomes substantially straight.

2. The gimbal assembly of claim 1, further comprising: a slider mounted to the mount portion.

3. The gimbal assembly of claim 1, further comprising: a load beam, wherein the tip portion includes a weld location at which the tip portion is welded to the load beam.

4. The gimbal assembly of claim 3, wherein the base portion includes a plurality of weld locations at which the base portion is welded to the load beam.

5. The gimbal assembly of claim 1, wherein the crossbar is disposed between the tip portion and the mount portion.

6. The gimbal assembly of claim 1, wherein the tip portion is disposed between the crossbar and the mount portion.

\* \* \* \* \*